United States Patent
Chikamori et al.

(10) Patent No.: US 10,816,861 B2
(45) Date of Patent: Oct. 27, 2020

(54) HIGH TRANSMISSION ITO FILM-COATED GLASS

(71) Applicant: ORTUS TECHNOLOGY CO., LTD., Hino-shi, Tokyo (JP)

(72) Inventors: Hiroyuki Chikamori, Hino (JP); Takuya Matsumoto, Hino (JP)

(73) Assignee: TOPPAN PRINTING CO., LTD., Taito-ku, Tokyo (JP)

( * ) Notice: Subject to any disclaimer, the term of this patent is extended or adjusted under 35 U.S.C. 154(b) by 255 days.

(21) Appl. No.: 16/083,513

(22) PCT Filed: Feb. 22, 2017

(86) PCT No.: PCT/JP2017/006621
§ 371 (c)(1),
(2) Date: Sep. 10, 2018

(87) PCT Pub. No.: WO2017/163734
PCT Pub. Date: Sep. 28, 2017

(65) Prior Publication Data
US 2019/0107747 A1    Apr. 11, 2019

(30) Foreign Application Priority Data
Mar. 22, 2016  (JP) ................. 2016-057183

(51) Int. Cl.
*G02F 1/01*  (2006.01)
*G02F 1/1343*  (2006.01)
(Continued)

(52) U.S. Cl.
CPC .... *G02F 1/13439* (2013.01); *G02F 1/133502* (2013.01); *G02B 1/113* (2013.01); *G02F 2201/38* (2013.01); *G02F 2203/11* (2013.01)

(58) Field of Classification Search
CPC ........... G02F 1/13439; G02F 1/133502; G02F 2201/38; G02F 2203/11; G02B 1/113;
(Continued)

(56) References Cited

U.S. PATENT DOCUMENTS

| 4,904,059 A | * | 2/1990 | Torigoe | ............ G02F 1/133502 349/138 |
| 6,215,928 B1 | | 4/2001 | Friesem et al. | |

(Continued)

FOREIGN PATENT DOCUMENTS

| JP | S60-017421 A | 1/1985 |
| JP | 2000-514566 A | 10/2000 |

(Continued)

OTHER PUBLICATIONS

International Search Report for PCT/JP2017/006621 dated May 9, 2017.
PCT written opinion dated May 9, 2017.

*Primary Examiner* — William R Alexander
*Assistant Examiner* — Henry A Duong
(74) *Attorney, Agent, or Firm* — Yokoi & Co., U.S.A.; Toshiyuki Yokoi

(57) ABSTRACT

The present invention provides a high transmission glass with an ITO film which is excellent in a higher transmittance and reduced reflection, produced by fewer steps at lower cost, and used as an optical switch for optical communication utilizing infrared ray. The high transmission ITO film-coated glass is used for a liquid crystal device utilizing infrared ray having a wavelength region from 1530 nm to 1570 nm as incident light. The high transmission ITO film-coated glass 10 is configured to be arranged to sandwich a liquid crystal layer, the high transmission ITO film-coated glass has an ITO film 2 formed on an inside face of the glass substrate 1 to face the liquid crystal layer when arranged with the liquid crystal layer, and the high trans- (Continued)

mission ITO film-coated glass has a SiOx film 11 ($1 \leq x < 2$) formed between the ITO film 2 and the glass substrate 1.

6 Claims, 12 Drawing Sheets

(51) Int. Cl.
*G02F 1/1335* (2006.01)
*G02B 1/113* (2015.01)

(58) Field of Classification Search
CPC ........... G02B 1/105; G02B 1/11; G02B 1/111;
G02B 1/115; G02B 1/14; G02B 1/16;
G02B 1/18
USPC ......................................................... 359/582
See application file for complete search history.

(56) References Cited

U.S. PATENT DOCUMENTS

| | | |
|---|---|---|
| 2006/0007385 A1 | 1/2006 | Murata et al. |
| 2010/0127611 A1 | 5/2010 | Imura et al. |

FOREIGN PATENT DOCUMENTS

| | | |
|---|---|---|
| JP | 2005-166427 A | 6/2005 |
| JP | 2005-294084 A | 10/2005 |
| JP | 2009-003440 A | 1/2009 |
| JP | 2012-148405 A | 8/2012 |
| WO | 2004/079436 A | 9/2004 |
| WO | 2010/134446 A | 11/2010 |

* cited by examiner

HIGH TRANSMISSION ITO FILM-COATED GLASS

TECHNICAL FIELD

The present invention relates to a high transmission ITO film-coated glass used in an optical communication device utilizing infrared ray.

BACKGROUND ART

Conventionally, it has been effective to use light having different wavelengths in optical communication, and a laser light source has been utilized as one of the light sources to generate light having different wavelengths. Infrared light having a wavelength from 1500 nm to 1600 nm is typically used as the laser light source.

In recent years, a method using a liquid crystal device (e.g. liquid crystal panel) as an optical switch for optical communication is known, in addition to a method using MEMS (Micro Electro Mechanical Systems).

For example, Patent Document 1 discloses that the laser wavelengths can be changed by applying a voltage to transparent electrodes such as ITO electrodes to vary a refractive index of liquid crystal in an optical communication device utilizing infrared ray near 1.55 μm.

Namely, when using a liquid crystal device, a destination of light can be changed by arranging ITO film-coated glass substrates provided with ITO electrodes to sandwich a liquid crystal layer and by applying a voltage to the ITO electrodes opposed to each other across the liquid crystal layer to vary the refractive index of liquid crystal.

On the other hand, when using the liquid crystal device as an optical switch for optical communication utilizing infrared ray, the ITO electrodes have a large extinction coefficient in the infrared ray wavelength region from 1500 nm to 1600 nm and the light may be absorbed and attenuated. Therefore, it is required for efficiently reading infrared ray in a commonly used certain polarization state (light having a wavelength region from 1530 nm to 1570 nm) and changing only the polarization state without attenuating the laser beam.

To reduce reflection as much as possible, antireflection film is generally attached on an outside face of the transparent glass substrate (the opposite side of the liquid crystal layer) when using the liquid crystal device. The antireflection film is attached to reduce reflection on a boundary surface between the glass substrate and the air since the refractive index of the glass is from 1.4 to 1.5 and the refractive index of the air is 1.0, and the boundary surface has different refractive indices.

PRIOR ART DOCUMENTS

Patent Documents

Patent Document 1: Japanese Translation of PCT International Application Publication No. 2000-514566.
Patent Document 2: Japanese Unexamined Patent Application Publication No. 2009-3440.

DISCLOSURE OF THE INVENTION

Problems to be Solved by the Invention

However, in the conventional ITO film-coated glass, the refractive index of the ITO electrode attached on the side of the liquid crystal layer of the glass substrate is 1.9 to 2.0, the refractive index of the glass is 1.4 to 1.5, and the refractive index of the liquid crystal is 1.4 to 1.5. Therefore, the boundary surfaces between the ITO electrode and the glass substrate and between the ITO electrode and liquid crystal have different refractive indices. Since no specific countermeasures for it has been taken, there is a problem that reflection may occur, although only slightly.

In Patent Document 2, for example, an antireflection film (12) is further formed between the glass substrate and the ITO electrode (transparent conductive film 13) to solve the above problem. However, since the antireflection film (12) is a laminated film formed of a high refractive index layer (14) and a low refractive index layer (15), there are problems that the production steps may become complicated and expensive.

The present invention has been made to solve the above problems and aims to provide a high transmission ITO film-coated glass which is excellent in higher transmittance and reduced reflection, produced by fewer production steps at low cost and used as an optical switch for optical communication utilizing infrared ray.

Means for Solving the Problem

To achieve the above objects, the present invention provides a high transmission ITO film-coated glass used for a liquid crystal device utilizing infrared ray having a wavelength region from 1530 nm to 1570 nm as incident light. The high transmission ITO film-coated glass is characterized in that the high transmission ITO film-coated glass is configured to be arranged to sandwich a liquid crystal layer, the high transmission ITO film-coated glass has an ITO film formed on an inside face of the glass substrate (a side of the liquid crystal layer) and the high transmission ITO film-coated glass has a SiOx film ($1 \leq x < 2$) formed between the ITO film and the glass substrate.

Effects of the Invention

According to a high transmission ITO film-coated glass of the invention, it is possible to provide a liquid crystal device which is excellent in higher transmittance and reduced reflection, produced by fewer steps at lower cost and used as an optical switch for optical communication utilizing infrared light having a wavelength region from 1530 nm to 1570 nm.

MODES FOR CARRYING OUT THE INVENTION

A high transmission ITO film-coated glass of the present invention is used for a liquid crystal device used as an optical switch for optical communication. The high transmission ITO film-coated glass is capable of efficiently reading infrared ray of a certain polarization state (light having a wavelength region from 1530 nm to 1570 nm) and changing only its polarization state without attenuating its laser light. Therefore, the present invention is used for a liquid crystal device utilizing infrared ray having a wavelength region from 1530 nm to 1570 nm as an incident light.

Hereinafter, embodiments of the present invention will be explained in details with reference to the drawings.

Figure 1:
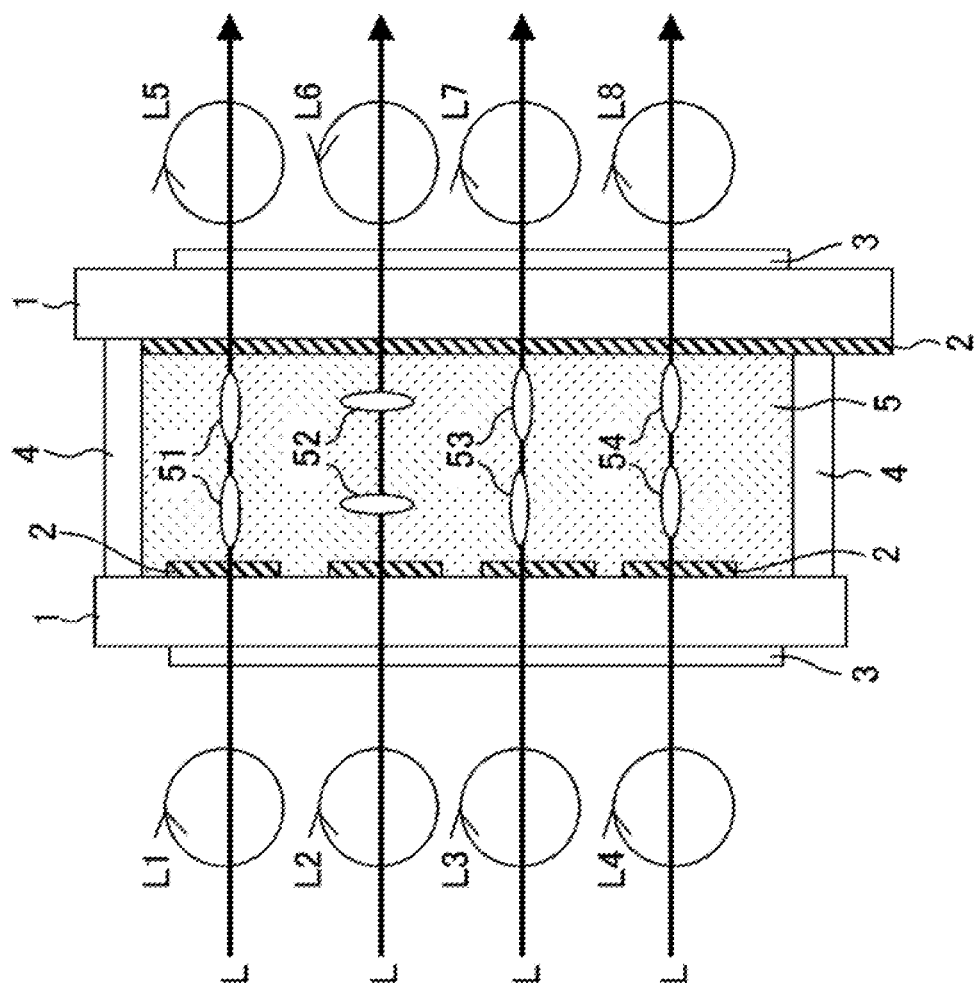
FIG. 1 is an explanatory view showing a schematic configuration of a general liquid crystal device used as an optical switch for optical communication and a polarization state of light.

FIG. 1 is an explanatory view showing a schematic configuration of a general liquid crystal device used as an optical switch for optical communication and a polarization state of light.

This liquid crystal device has a liquid crystal layer 5 between opposing glass substrates 1, 1 via spacers 4, 4. Further, the glass substrates 1, 1 are provided with ITO electrodes 2, 2 on an inside face of each glass substrate (on a side of the liquid crystal layer 5) and provided with antireflection films 3, 3 on an outside face of each glass substrate (the opposite side of the liquid crystal layer 5).

Here, when infrared ray L (light having a wavelength region from 1530 nm to 1570 nm) of a certain polarization state is incident from left to right direction as shown by arrows in the drawing, the incident light is assumed to have a polarization state as shown by arrows L1, L2, L3, and L4 in FIG. 1. Note that four incident infrared lights L are considered to simplify the explanation.

As shown in FIG. 1, liquid crystal molecules 51, 51, 53, 53 and 54, 54 respectively corresponding to the first, third and fourth infrared lights L counted from top are horizontally placed (in a lying state), whereas only liquid crystal molecules 52, 52 corresponding to the second infrared light are vertically placed (in a standing state). This configuration allows to reverse only the polarization state of the outgoing light of the second light from top as shown by an arrow L6 compared to the polarization state of the incident light L2.

The polarization states of the outgoing lights L5, L7 and L8 of the first, third and fourth incident lights are maintained to have the same direction as the polarization states of the incident lights L1, L3 and L4, respectively.

In this way, the destination of light (emitting direction) can be changed by altering the orientation of the liquid crystal molecules horizontally or vertically.

Figure 2:
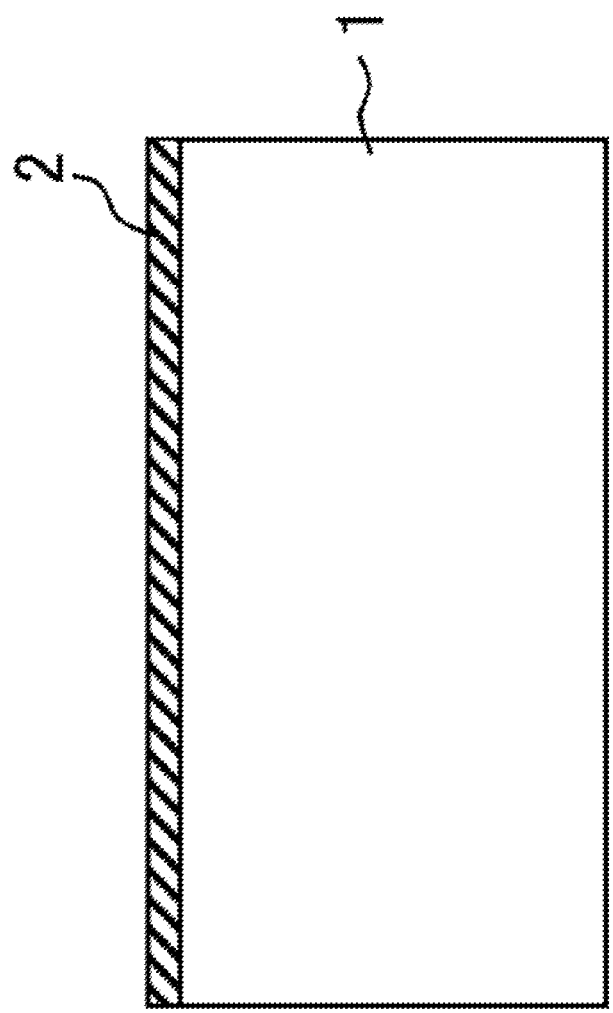
FIG. 2 is a drawing showing a schematic configuration of a conventional ITO film-coated glass.

FIG. 2 shows a schematic configuration of a conventional ITO film-coated glass. This is an enlarged view of the glass substrate 1 and the ITO electrode 2 attached to the inside face of the glass substrate 1 (on the side of the liquid crystal layer 5) in FIG. 1. The film thickness of the ITO electrode 2 is 8 nm±3 nm. If the film thickness is less than 5 nm, the film is so thin that the sheet resistance may increase and a drive voltage may become large. On the other hand, if the film thickness is more than 11 nm, for example, a high transmittance cannot be expected. Therefore, the film thickness of 8 nm±3 nm is preferable.

Here, as also described in the conventional technology, there is a problem that reflection occurs slightly due to differences in the refractive index on the boundary surfaces between the ITO electrode 2 and the glass substrate 1 and also between the ITO electrode 2 and the liquid crystal layer 5 since the refractive index of the ITO electrode 2 attached on the inside face of the glass substrate 1 (on the side of the liquid crystal layer 5) is 1.9 to 2.0, the refractive index of the glass is 1.4 to 1.5, and the refractive index of the liquid crystal is 1.4 to 1.5.

The applicant of the present invention repeated various experiments to realize a liquid crystal device which reduces such slight reflection, efficiently utilizes infrared light without attenuating the infrared ray, and is used for optical communication.

First Embodiment

Figure 3:
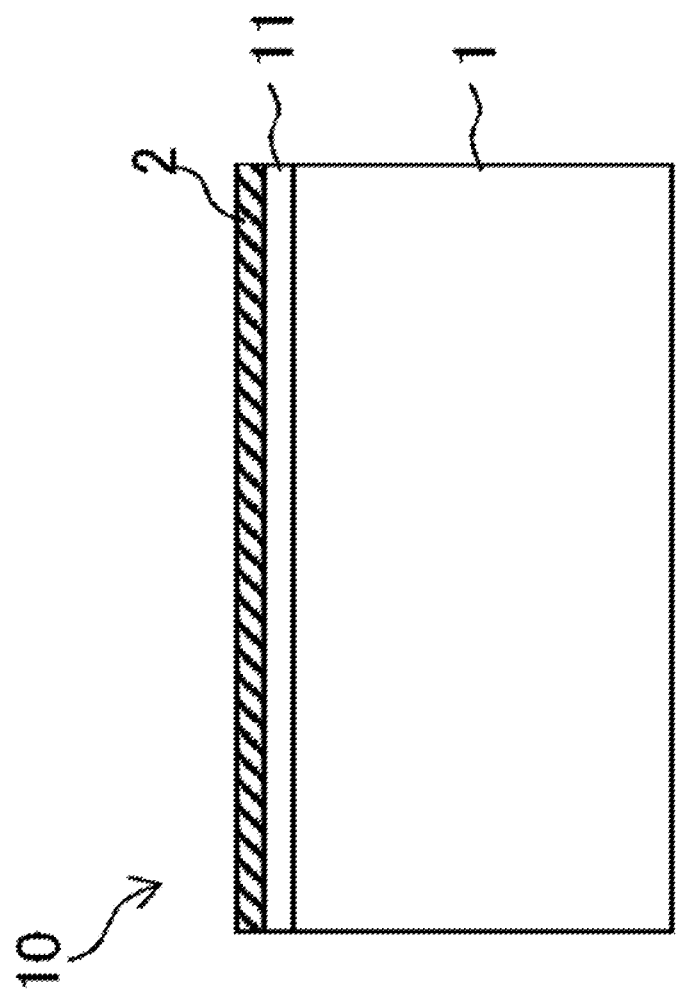
FIG. 3 is a drawing showing a schematic configuration of a high transmission ITO film-coated glass according to the first embodiment.

FIG. 3 shows a schematic configuration of a high transmission ITO film-coated glass in the first embodiment of the present invention. FIG. 3 generally corresponds to the conventional ITO film-coated glass shown in FIG. 2.

The ITO film-coated glass 10 with high transmittance in the first embodiment is configured to be arranged to sandwich a liquid crystal layer by two ITO film-coated glasses 10. The ITO film-coated glass has an ITO film formed on an inside face of the glass substrate to face the liquid crystal layer when arranged with the liquid crystal layer. As shown in FIG. 3, the ITO film-coated glass has a SiOx film 11 ($1 \leq x < 2$) formed between the ITO electrode 2 and the glass substrate 1.

A detailed explanation of the method of forming the SiOx film ($1 \leq x < 2$) is omitted here since commonly used plasma CVD in which monosilane ($SiH_4$) and laughing gas ($N_2O$) are mixed can be used, for example.

Since a single layer SiOx film ($1 \leq x < 2$) is used for the film formed between the glass substrate 1 and the ITO electrode 2 instead of a laminated film, an $Al_2O_3$ film, a $SiO_2$ film or the like, the high transmission ITO film-coated glass 10 can be produced by fewer production steps at lower cost with a higher transmittance. The same is applied to the following embodiments.

Figure 4:
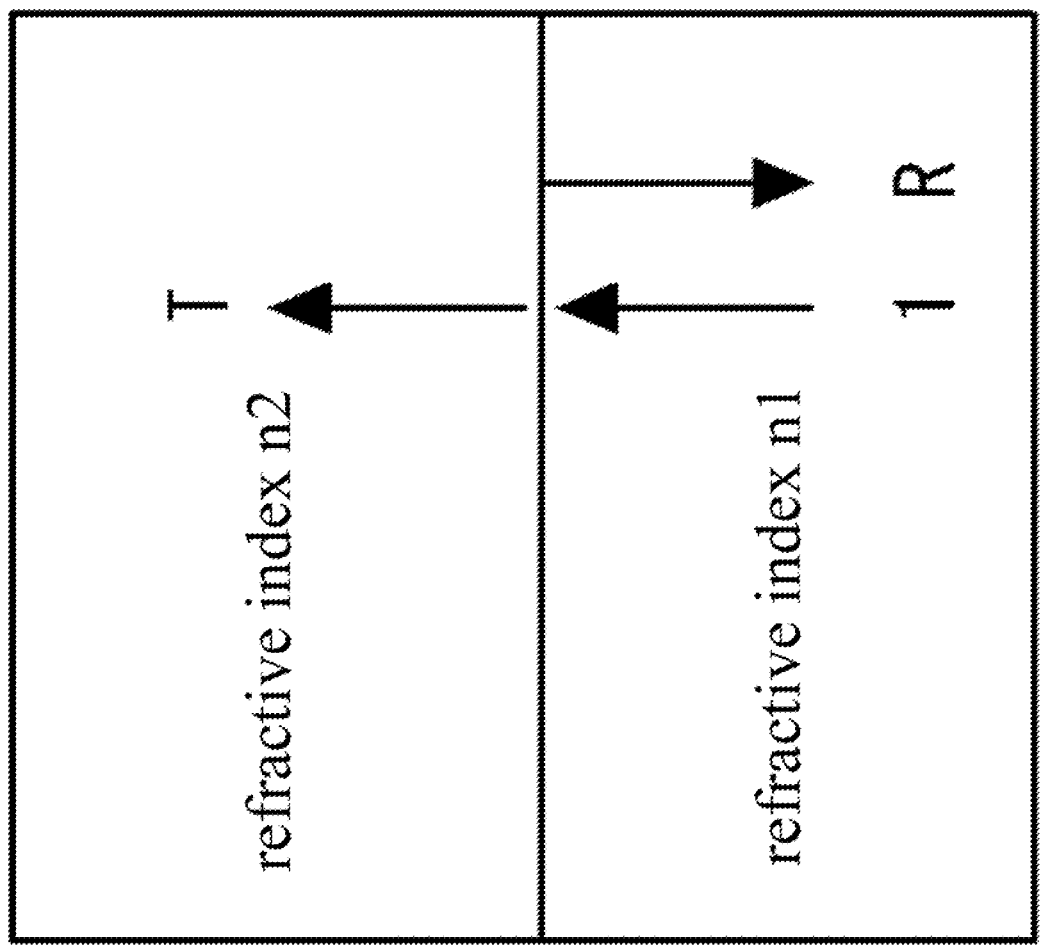
FIG. 4 is a schematic diagram showing a relationship between a reflectance R and a transmittance T on a boundary surface when light enters from a material with a refractive index n1 to a material with a refractive index n2.

Here, it will be explained that the transmittance is higher (transmission intensity is larger) when the SiOx film ($1 \leq x < 2$) is used for the film formed between the glass substrate 1 and the ITO electrode 2 compared to the case where the $SiO_2$ film is used. As shown in FIG. 4, when light enters from a material with a refractive index n1 to a material with a refractive index n2, a reflectance R and a transmittance T at the boundary surface can be represented by the following formulas (1) and (2).

$$R = ((n1-n2)/(n1+n2))^2 \quad (1)$$

$$T = 4 \times n1 \times n2/(n1+n2)^2 \quad (2)$$

FIG. 4 is a schematic diagram showing a relationship between the reflectance R and the transmittance T on a boundary surface when light enters from a material with a refractive index n1 to a material with a refractive index n2. Note that R+T=1.

When the refractive index of the glass substrate 1 is n1, the refractive index of the ITO electrode 2 is n3, and the refractive index of the SiOx film 11 formed between the glass substrate 1 and the ITO electrode 2 is n2 in FIG. 3, the transmittance T [SiOx] can be represented by the following formula (3). For example, when x=1.5 is given, T [SiOx] =0.991 is calculated by substituting the refractive index n1 of the glass=1.52, the refractive index n2 of SiOx=1.75, and the refractive index n3 of the ITO=2.00.

$$T[SiOx] = \frac{4 \times n1 \times n2}{(n1+n2)^2} \times \frac{4 \times n2 \times n3}{(n2+n3)^2} \quad (3)$$

On the other hand, when the $SiO_2$ film is used for the film formed between the glass substrate 1 and the ITO electrode 2 in FIG. 3, the refractive index of the $SiO_2$ film is n2. Thus, the transmittance T [$SiO_2$] is obtained from the same formula (3), and T [$SiO_2$]=0.974 is calculated by substituting the refractive index n1 of the glass=1.52, the refractive index n2 of $SiO_2$=1.45, and the refractive index n3 of ITO=2.00 in the formula (3).

In this way, when the $SiO_2$ film is used for the film formed between the glass substrate 1 and the ITO electrode 2, the transmittance is 97.4%, while the transmittance is 99.1% when the SiOx film (x=1.5) is used. This is because the refractive index of SiOx ($1 \leq x < 2$) is larger than 1.45 while the refractive index of $SiO_2$ is 1.45. Thus, a higher transmittance can be achieved. As a result, when the SiOx film ($1 \leq x < 2$) film is used for the film formed between the glass substrate 1 and the ITO electrode 2, it is possible to produce the high transmission ITO film-coated glass 10 which has a higher transmittance compared with the case when the $SiO_2$ film is used.

However, since the transmittance of light varies depending on the interference due to film thicknesses of the ITO electrode 2 and the SiOx film 11 ($1 \leq x < 2$), the film thickness of the SiOx film 11 has to be adjusted in accordance with the film thickness of 8 nm±3 nm of the ITO electrode 2 to obtain the high transmission ITO film-coated glass which has a higher transmittance and reduced reflection.

Figure 5:
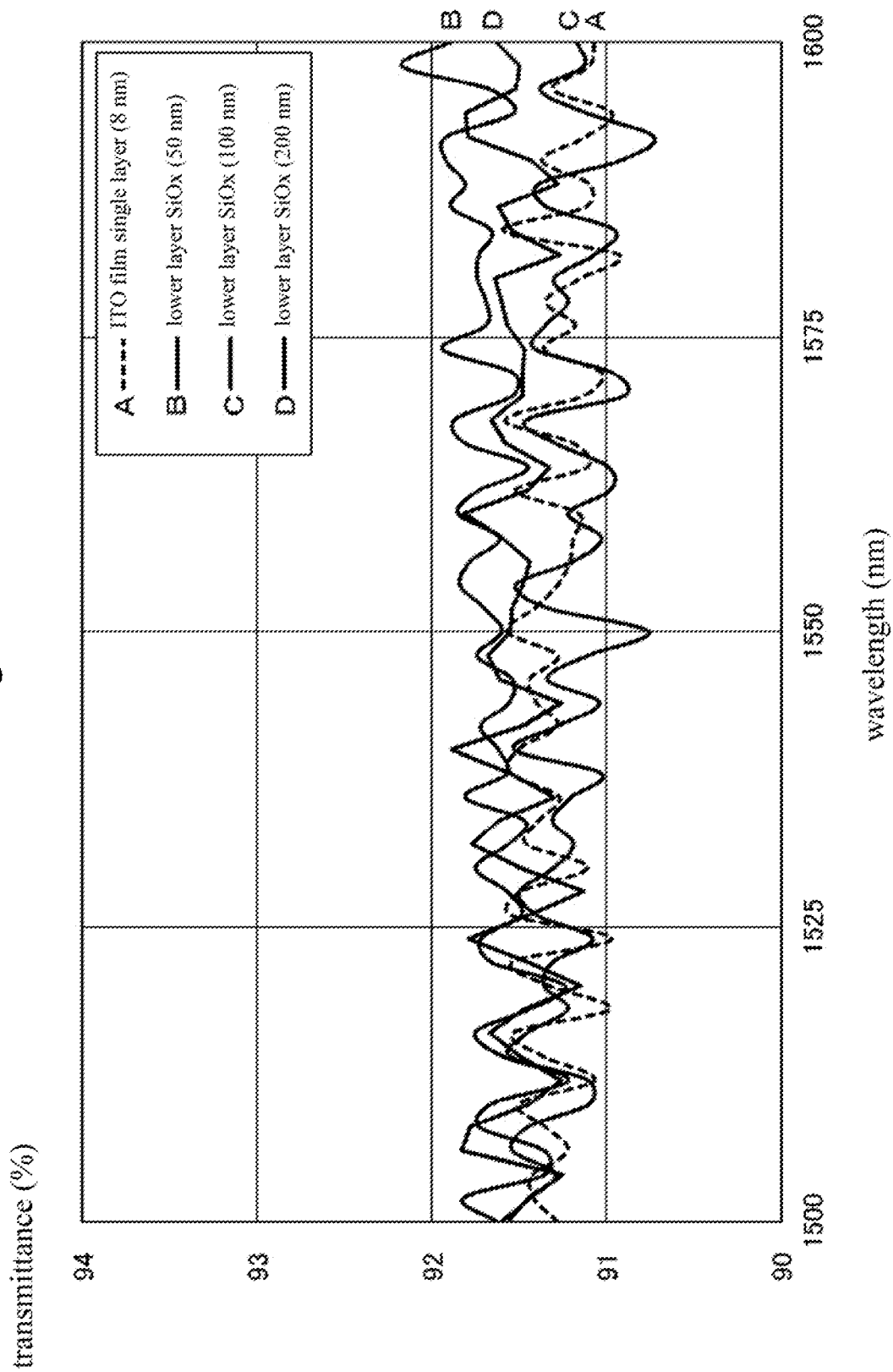
FIG. 5 is a graph showing experimental results of the transmittance through the high transmission ITO film-coated glass according to the first embodiment when the transmittance is measured with respect to infrared ray wavelengths.

FIG. 5 is a graph showing experimental results of the transmittance through the high transmission ITO film-coated glass 10 according to the first embodiment when the transmittance is measured with respect to infrared ray wavelengths. Here, the graph shows the measurement results of the transmittance in a light wavelength range from 1500 nm to 1600 nm when the film thickness of the ITO electrode 2 is 8 nm and the film thicknesses of the SiOx film 11 ($1 \leq x < 2$) are three kinds of 50 nm, 100 nm, and 200 nm.

The transmittance of the conventional ITO film-coated glass illustrated in FIG. 2 is also shown for comparison. In FIG. 5, the dashed line A indicates the transmittance of the conventional ITO film-coated glass. The solid lines B, C and D indicate the transmittance of the high transmission ITO film-coated glass 10 in which the SiOx film 11 ($1 \leq x < 2$) of the film thickness of respectively 50 nm, 100 nm and 200 nm is attached between the ITO electrode 2 and the glass substrate 1.

Although only three representative film thicknesses of the SiOx film 11 ($1 \leq x < 2$) are shown in FIG. 5, the applicant of the present application also conducted experiments on other film thicknesses and achieved to find the tendency of changes in transmittance with respect to the film thickness of the SiOx film 11 caused by the interference due to the film thicknesses of the ITO electrode 2 and the SiOx film 11. The results are shown in FIG. 6.

Figure 6:
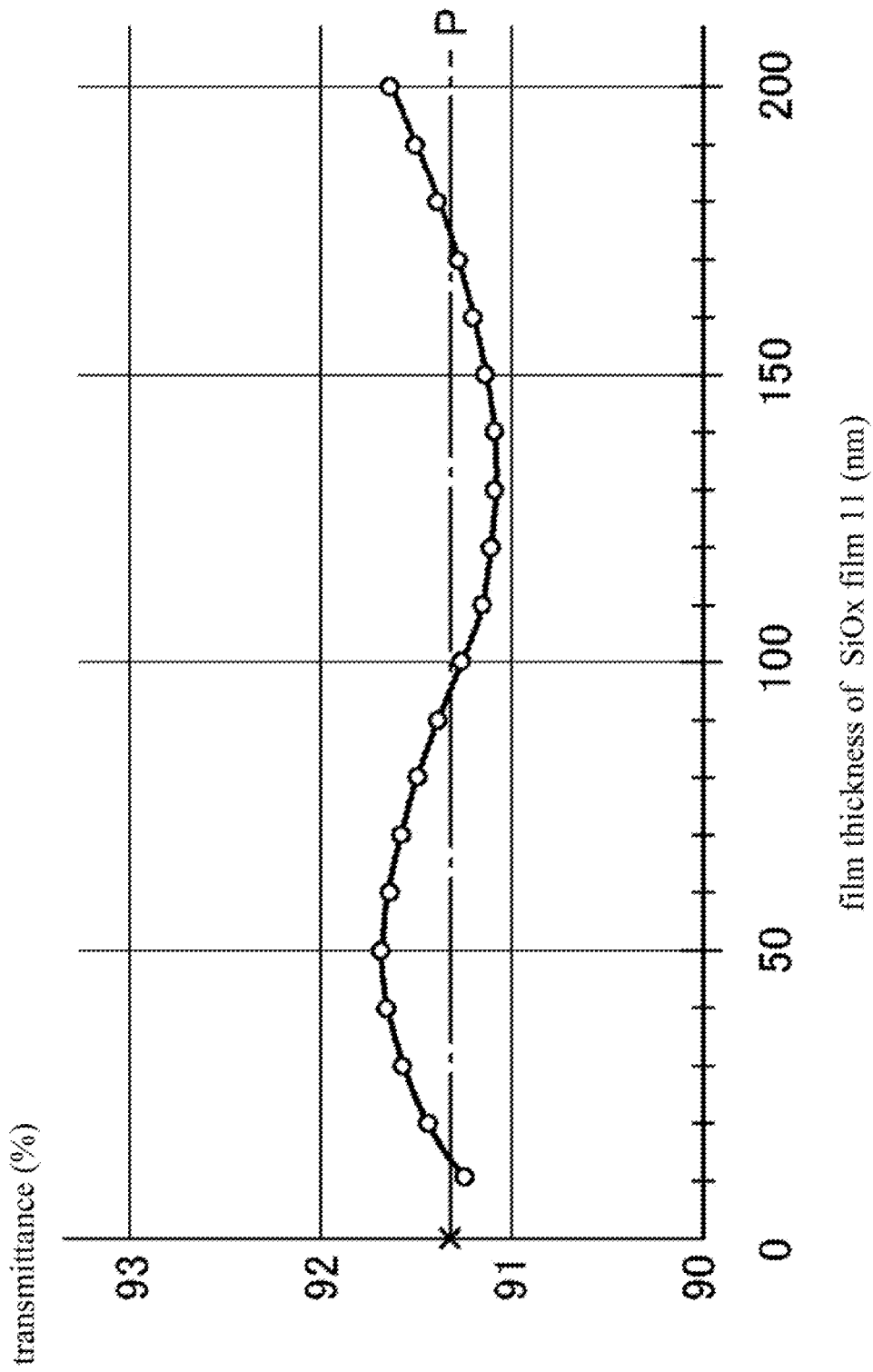
FIG. 6 is a graph showing experimental results of the transmittance through the high transmission ITO film-coated glass according to the first embodiment when the transmittance is measured with respect to film thicknesses of a SiOx film ($1 \leq x < 2$).

FIG. 6 is a graph showing experimental results of the transmittance through the high transmission ITO film-coated glass 10 according to the first embodiment when the transmittance is measured with respect to the film thickness of the SiOx film 11 ($1 \leq x < 2$). The film thickness of the ITO electrode 2 is also 8 nm in this case and the transmittance is an average value in an infrared ray wavelength region from 1530 nm to 1570 nm.

Here, the experiments were performed at 10 nm intervals of the film thickness of the SiOx film 11 ($1 \leq x < 2$) in a range of the film thickness from 10 nm to 200 nm. As a result, as shown in FIG. 6, there was a tendency that the transmittance was maximum around the film thickness of 50 nm and the transmittance was minimum around the film thickness of 130 nm of the SiOx film 11 and a gentle curve was drawn between them. Further, it was found that the transmittance was 0.4% higher than that of the conventional ITO film-coated glass shown in FIG. 2 when the film thickness of the SiOx film 11 was 50 nm.

Here, a mark "x" at the film thickness 0 nm of the SiOx film 11 ($1 \leq x < 2$) indicates the transmittance through the glass only with ITO electrode 2 without attaching the SiOx film 11 (the conventional ITO film-coated glass shown in FIG. 2), and a straight-line P of a dash-dotted line indicates the transmittance marked with "x" to compare the straight-line P with the curved line.

As a result, in the high transmission ITO film-coated glass 10 according to the first embodiment, it was found that the ITO film-coated glass surely had a higher transmittance than the conventional glass when the film thickness of the SiOx film 11 ($1 \leq x < 2$) is from 20 nm to 80 nm (50±30 nm) in the case where the film thickness of the ITO electrode 2 was 8 nm.

Here, as described above, the film thickness of the ITO electrode 2 is required to be 8 nm±3 nm. Therefore, when the film thickness of the ITO electrode 2 includes ranges of plus or minus 3 nm, the film thickness of the SiOx film 11 ($1 \leq x < 2$) also has to include ranges of plus or minus about 10 nm in view of the interference due to the film thickness.

Consequently, it is possible to achieve the higher transmission ITO film-coated glass than conventional glass by the configuration in which the film thickness of the ITO electrode 2 is 8 nm±3 nm and the film thickness of the SiOx film 11 ($1 \leq x < 2$) is 50±20 nm in the high transmission ITO film-coated glass 10 of the first embodiment.

As described above, according to the high transmission ITO film-coated glass 10 in the first embodiment, it is possible to provide the liquid crystal device which is excellent in a higher transmittance and reduced reflection, produced by fewer steps at lower cost and used as an optical switch for optical communication utilizing infrared light having a wavelength region from 1530 nm to 1570 nm.

Second Embodiment

Figure 7:
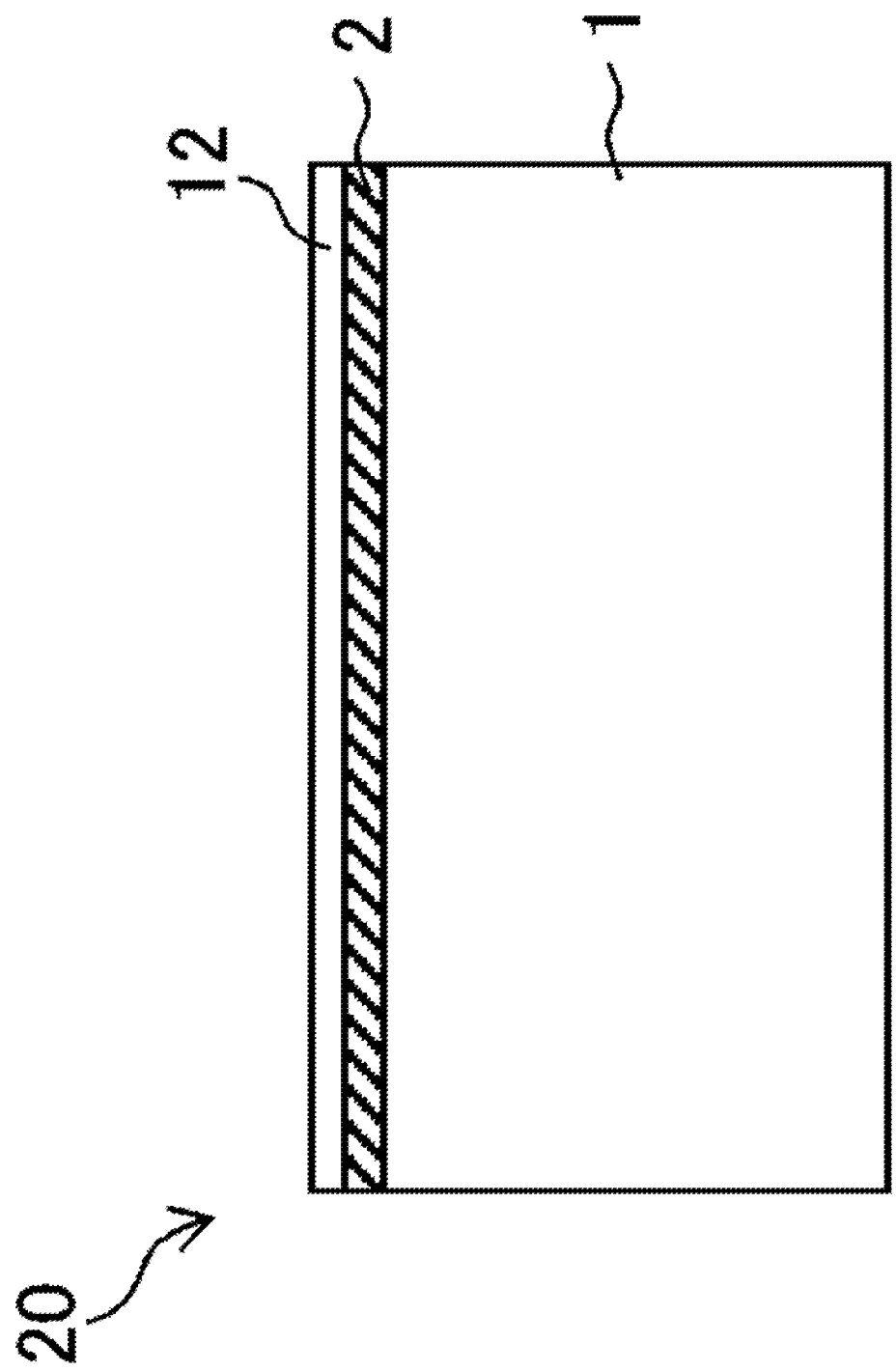
FIG. 7 is a drawing showing a schematic configuration of a high transmission ITO film-coated glass according to the second embodiment.

FIG. 7 shows a schematic configuration of a high transmission ITO film-coated glass in the second embodiment of the present invention. FIG. 7 generally corresponds to the conventional ITO film-coated glass shown in FIG. 2. Note that the same reference numerals are given to the same configurations as those described in the first embodiment, and repetitive explanations are omitted.

In the second embodiment, a high transmission ITO film-coated glass 20 is configured to be arranged to sandwich a liquid crystal layer by two ITO film-coated glasses 20. The ITO film-coated glass has an ITO film formed on an inside face of the glass substrate to face the liquid crystal layer when arranged with the liquid crystal layer. As shown in FIG. 7, the ITO film-coated glass has a SiOx film 12 ($1 \leq x < 2$) formed on a further inside of the ITO electrode 2 to face the liquid crystal layer when arranged with the liquid crystal layer.

Note that explanations of the method of forming the SiOx film ($1 \leq x < 2$) is omitted since the method is the same as described in the first embodiment.

Here, it will be described that the transmittance is higher (transmission intensity is larger) also in FIG. 7 when the SiOx film 12 ($1 \leq x < 2$) is formed on a further inside face (on the side of the liquid crystal layer) of the ITO electrode 2 compared to the case where the SiO$_2$ film is used.

When the refractive index of the glass substrate 1 is n1, the refractive index of the ITO electrode 2 is n2, and the refractive index of the SiOx film 12 formed on the side of the liquid crystal layer, on a further inside face of the ITO electrode 2 is n3 in FIG. 7, the transmittance T [SiOx] can be represented by the same formula as the formula (3). For example, when x=1.5 is given, T [SiOx]=0.977 is calculated by substitution of the refractive index n1 of the glass=1.52, the refractive index n2 of the ITO=2.00, and the refractive index n3 of SiOx=1.75.

On the other hand, when the SiO$_2$ film is used for the film formed on a further inside face (on the side of the liquid crystal layer) of the ITO electrode 2 in FIG. 7, the refractive index of the SiO$_2$ film is n3. Thus, the transmittance T [SiO$_2$] is obtained by the same formula (3), and T [SiO$_2$]=0.956 is calculated by substituting the refractive index n1 of the glass=1.52, the refractive index n2 of the ITO=2.00, and the refractive index n3 of the SiO$_2$=1.45 in the formula (3).

In this way, when the SiO$_2$ film is used for the film formed on a further inside face (on the side of the liquid crystal layer) of the ITO electrode 2, the transmittance is 95.6%, while the transmittance is 97.7% when the SiOx film (x=1.5) is used. This is because the refractive index of SiOx ($1 \leq x < 2$) is larger than 1.45 while the refractive index of SiO$_2$ is 1.45, and a higher transmittance can be achieved. As a result, when the SiOx film ($1 \leq x < 2$) is used for the film formed on an inside face (on the side of the liquid crystal layer) of the ITO electrode 2, it is possible to produce high transmission ITO film-coated glass 20 which has a higher transmittance compared with the case when the SiOx film is used.

Also in the second embodiment, since the transmittance of light varies depending on the interference due to the film thicknesses of the ITO electrode 2 and the SiOx film 12 ($1 \leq x < 2$), the film thickness of the SiOx film 12 has to be adjusted in accordance with the film thickness of 8 nm±3 nm of the ITO electrode 2 to obtain the high transmission ITO film-coated glass which has a higher transmittance and reduced reflection.

Figure 8:
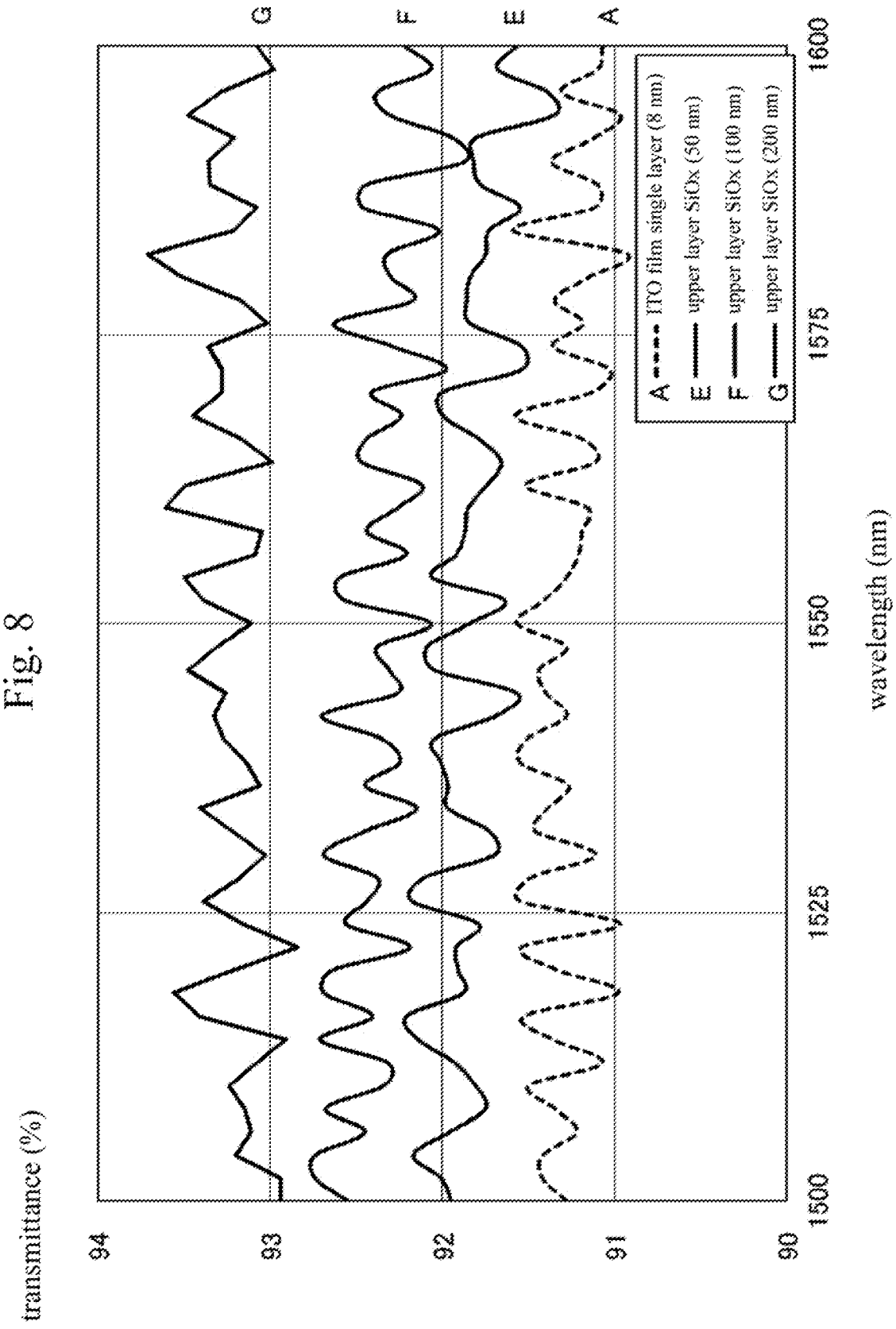
FIG. 8 is a graph showing experimental results of transmittance through the high transmission ITO film-coated glass according to the second embodiment when the transmittance is measured with respect to infrared ray wavelengths.

FIG. 8 is a graph showing experimental results of transmittance through the high transmission ITO film-coated glass 20 in the second embodiment when the transmittance is measured with respect to infrared ray wavelengths. Here, the graph shows the measurement results of the transmittance in a light wavelength range from 1500 nm to 1600 nm when the film thickness of the ITO electrode 2 is 8 nm and the film thicknesses of the SiOx film 12 ($1 \leq x < 2$) are three kinds of 50 nm, 100 nm, and 200 nm.

The transmittance of the conventional ITO film-coated glass illustrated in FIG. 2 is also shown for comparison. In FIG. 8, the dashed line A indicates the transmittance of the conventional ITO film-coated glass. The slid lines E, F and G indicate the transmittance of the high transmission ITO film-coated glass 20 in which the SiOx film 12 ($1 \leq x < 2$) having the film thickness of respectively 50 nm, 100 nm and 200 nm is attached inside face of the ITO electrode 2 (on the side of the liquid crystal layer, that is, the opposite side of the glass substrate 1).

Although only three representative film thicknesses of the SiOx film 12 ($1 \leq x < 2$) are shown in FIG. 8, the applicant of the present application also conducted experiments on other film thicknesses and achieved to find the tendency of changes in transmittance with respect to the film thickness of the SiOx film 12 caused by the interference due to the film thickness of the ITO electrode 2 and the film thickness of the SiOx film 12. The results are shown in FIG. 9.

Figure 9:
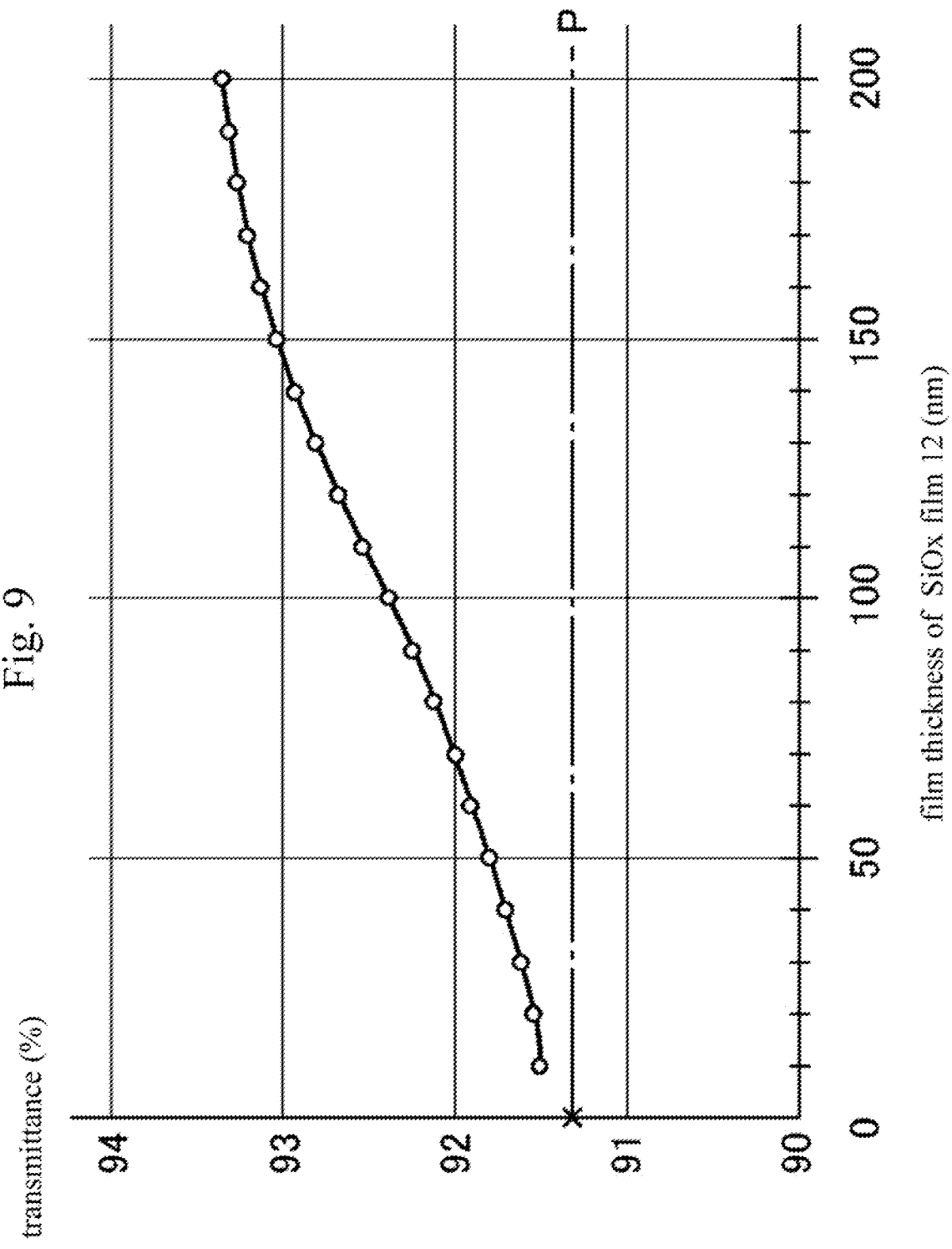
FIG. 9 is a graph showing experimental results of transmittance through the high transmission ITO film-coated glass according to the second embodiment when the transmittance is measured with respect to film thicknesses of the SiOx film ($1 \leq x < 2$).

FIG. 9 is a graph showing experimental results of transmittance through the high transmission ITO film-coated glass 20 according to the second embodiment when the transmittance is measured with respect to the film thickness of the SiOx film 12 ($1 \leq x < 2$). The film thickness of the ITO electrode 2 is also 8 nm in this case and the transmittance is an average value in an infrared ray wavelength from 1530 nm to 1570 nm.

Here, the experiments were performed at 10 nm intervals of the film thickness of the SiOx film 12 ($1 \leq x < 2$) in a range of the film thickness of 10 nm to 200 nm. As a result, as shown in FIG. 9, there was a tendency that the transmittance was higher as the film thickness of the SiOx film 12 was thicker, and a gentle ascent curve was drawn toward the maximum transmittance at the film thickness of 200 nm.

Further, it was found that the transmittance was 2.1% higher than that of the conventional ITO film-coated glass in FIG. 2 when the film thickness of the SiOx film 12 was 200 nm.

Here, a mark "x" at the film thickness 0 nm of the SiOx film 12 ($1 \leq x < 2$) indicates the transmittance through the glass only with the ITO electrode 2 without attaching the SiOx film 12 (the conventional ITO film-coated glass shown in FIG. 2), and a straight-line P of a dash-dotted line indicates the transmittance marked with "x" to compare the straight-line P with the curved line.

As a result, in the high transmission ITO film-coated glass 20 in the second embodiment, it was found that the closer the film thickness of the SiOx film 12 ($1 \leq x < 2$) was to 200 nm, the more the ITO film-coated glass surely had a higher transmittance than that of conventional ITO film-coated glass when the film thickness of the ITO electrode 2 was 8 nm.

Also, even when the film thickness is 200 nm or more, it is predictable that the ITO film-coated glass may have a higher transmittance than that of the conventional ITO film-coated glass by using the SiOx film 12 ($1 \leq x < 2$) having a film thickness of at least up to 350 nm. Therefore, it can be said that the ITO film-coated glass has a higher transmittance than that of conventional ITO film-coated glass when the film thickness of the SiOx film 12 (1≤x<2) is from 50 nm to 350 nm (200 nm±150 nm).

Here, as described above, the film thickness of the ITO electrode 2 is required to be 8 nm±3 nm. Therefore, when the film thickness of the ITO electrode 2 includes ranges of plus or minus 3 nm, the film thickness of the SiOx film 12 (1≤x<2) also has to include ranges of plus or minus about 10 nm in view of the interference due to the film thicknesses.

Consequently, it is possible to realize the higher transmission ITO film-coated glass than conventional glass by the configuration in which the film thickness of the ITO electrode 2 is 8 nm±3 nm and the film thickness of the SiOx film 12 (1≤x<2) is 200±140 nm in the high transmission ITO film-coated glass 20 of the second embodiment.

As described above, according to the high transmission ITO film-coated glass 20 in the second embodiment, it is possible to produce the liquid crystal device which is excellent in a higher transmittance and reduced reflection, produced fewer steps at lower cost, and used as an optical switch for optical communication utilizing infrared light having a wavelength region 1530 nm to 1570 nm.

Third Embodiment

Figure 10:
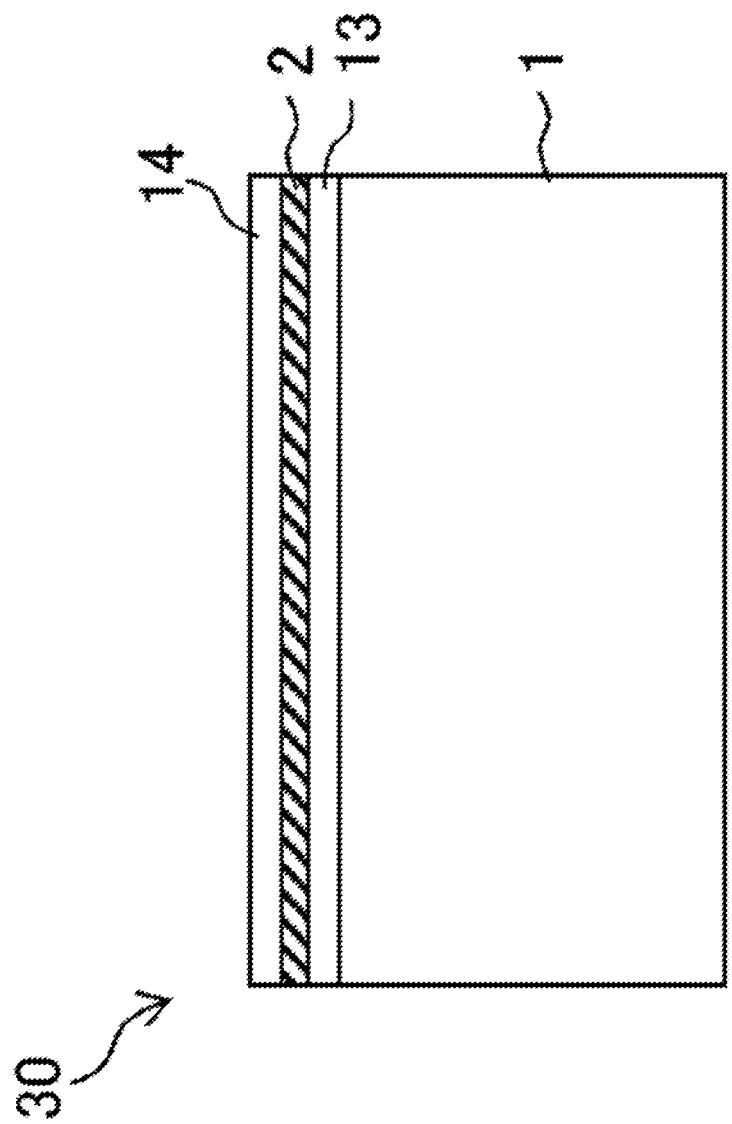
FIG. 10 is a drawing showing a schematic configuration of a high transmission ITO film-coated glass according to the third embodiment.

FIG. 10 shows a schematic configuration of a high transmission ITO film-coated glass according to the third embodiment. FIG. 10 generally corresponds to the conventional ITO film-coated glass shown in FIG. 2. Note that the same reference numerals are given to the same configurations as those described in the first embodiment, and repetitive explanations are omitted.

In the third embodiment, the high transmission ITO film-coated glass 30 is configured to be arranged to sandwich a liquid crystal layer by two ITO film-coated glasses 30. The high transmission ITO film-coated glass has an ITO film formed on an inside face of the glass substrate to face the liquid crystal layer when arranged with the liquid crystal layer. As shown in FIG. 10, the high transmission ITO film-coated glass has a SiOx film 13 (1≤x<2) formed under an ITO electrode 2 and a SiOx film 14 (1≤x<2) formed on the ITO electrode 2. In other words, the SiOx film 13 ( ) is formed between a glass substrate 1 and the ITO electrode 2, and the SiOx film 14 (1≤x<2) is formed on a further inside face of the ITO electrode 2 to face the liquid crystal layer when arranged with the liquid crystal layer.

Note that explanations of the method of forming the SiOx film (1≤x<2) is omitted since the method is the same as described in the first embodiment.

Also in the third embodiment, since the transmittance of light varies depending on the interference due to the film thicknesses of the ITO electrode 2 and the SiOx films 13, 14 (1≤x<2), the film thicknesses of the SiOx films 13, 14 have to be adjusted according to the film thickness of 8 nm±3 nm of the ITO electrode 2 to obtain the high transmission ITO film-coated glass which has a higher transmittance and reduced reflection.

Figure 11:
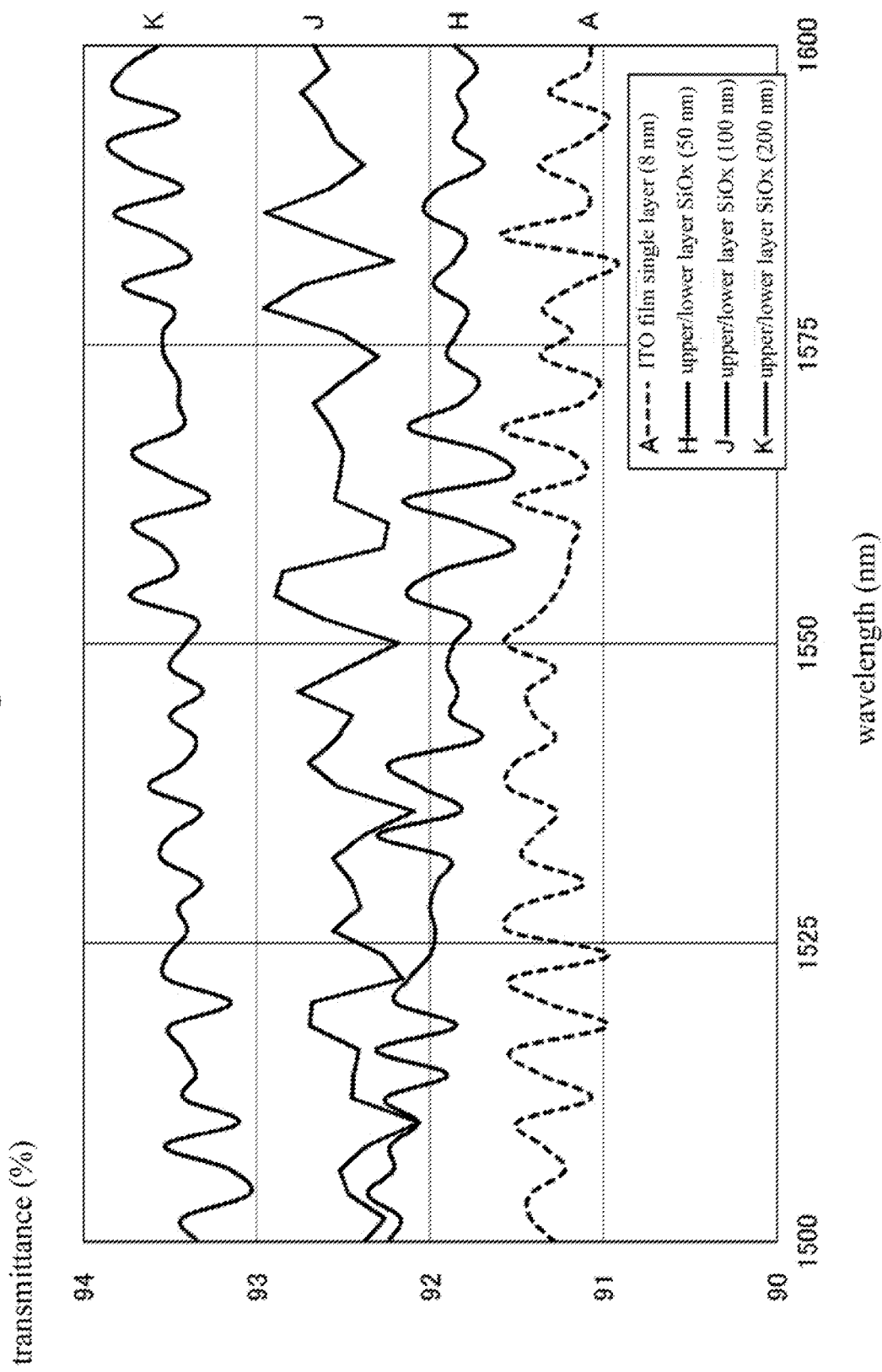
FIG. 11 is a graph showing experimental results of transmittance through the high transmission ITO film-coated glass according to the third embodiment when the transmittance is measured with respect to infrared ray wavelengths.

FIG. 11 is a graph showing experimental results of the transmittance through the high transmission ITO film-coated glass 30 in the third embodiment when the transmittance is measured with respect to infrared ray wavelengths. Here, the graph shows the measurement results of the transmittance in a light wavelength range from 1500 nm to 1600 nm when the film thickness of the ITO electrode 2 is 8 nm and the film thicknesses of the SiOx films 13, 14 (1≤x<2) are three kinds of 50 nm, 100 nm, and 200 nm.

The transmittance of the conventional ITO film-coated glass illustrated in FIG. 2 is also shown for comparison. In FIG. 11, a dashed line A indicates the transmittance of the conventional ITO film-coated glass, and solid line H, J and K indicate the transmittance of the high transmission ITO film-coated glass 30 in which SiOx films 13 and 14 (1≤x<2) each having the film thickness of respectively 50 nm, 100 nm and 200 nm is attached inside face (on the side of the liquid crystal layer) and outside face of the ITO electrode 2 (between the glass substrate 1 and the ITO electrode 2).

Figure 12:
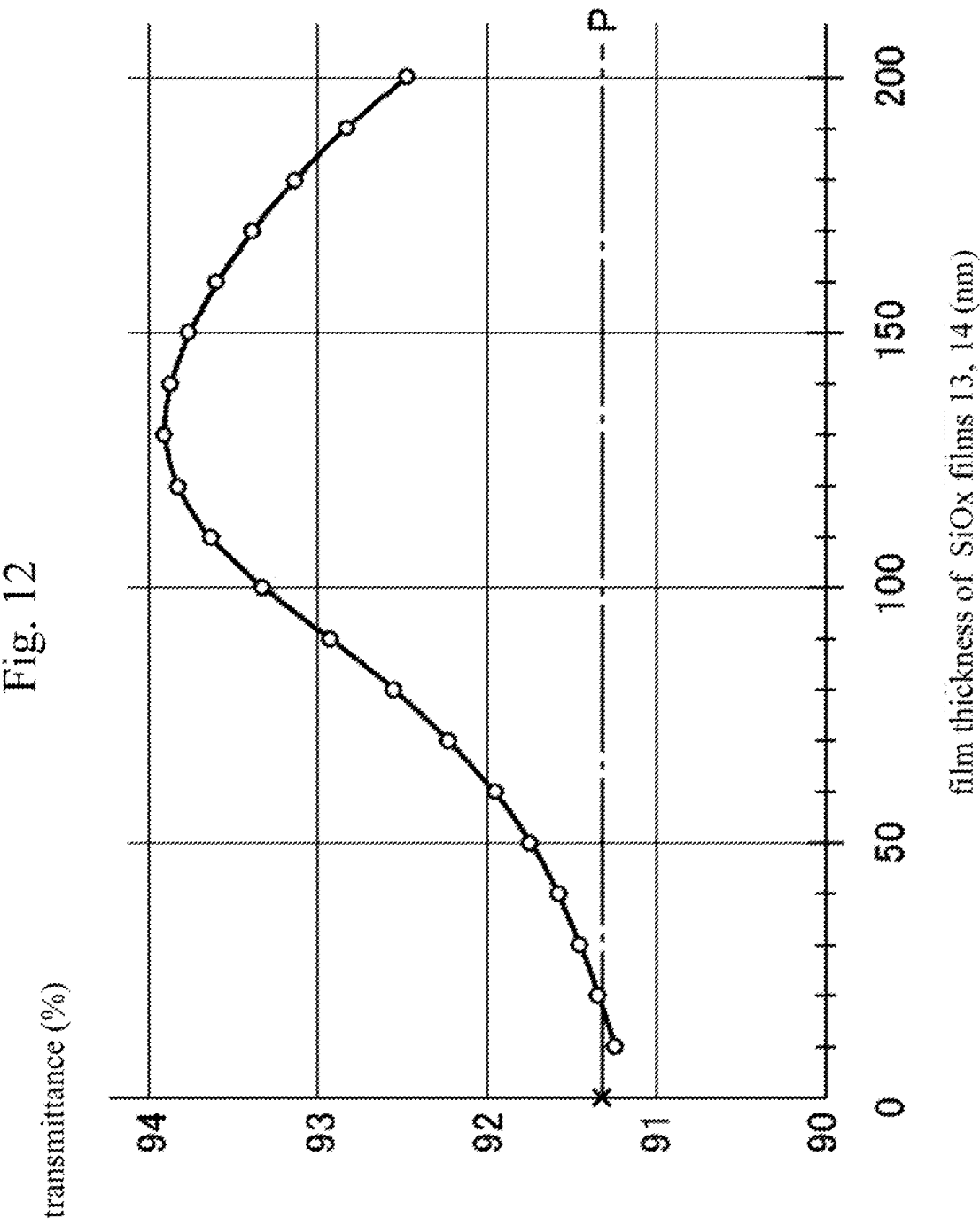
FIG. 12 is a graph showing experimental results of transmittance through the high transmission ITO film-coated glass according to the third embodiment when the transmittance is measured with respect to film thicknesses of the SiOx films ($1 \leq x < 2$).

Although only three representative film thicknesses of the SiOx films 13, 14 (1≤x<2) are shown in FIG. 11, the applicant of the present application also conducted experiments on other film thicknesses and achieved to find the tendency of the change in transmittance with respect to the film thickness of the SiOx films 13, 14 caused by the interference due to the film thickness of the ITO electrode 2 and the film thickness of the SiOx films 13, 14. The results are shown in FIG. 12. Note that the SiOx film 13 and the SiOx film 14 have a same film thickness.

FIG. 12 is a graph showing experimental results of the transmittance through the high transmission ITO film-coated glass 30 according to the third embodiment when the transmittance is measured with respect to film thicknesses of the SiOx films 13, 14 (1≤x<2). The film thickness of the ITO electrode 2 is also 8 nm in this case and the transmittance is an average value in an infrared ray wavelength from 1530 nm to 1570 nm.

Here, the experiments were performed at 10 nm intervals of the film thickness of the SiOx films 13, 14 (1≤x<2) in a range of the film thickness of 10 nm to 200 nm. As a result, as shown in FIG. 12, there was a tendency that the transmittance was maximum at the SiOx film thickness of around 130 nm and the transmittance was minimum at the SiOx film thickness of 10 nm and a gentle mountain curve was drawn from the minimum transmittance to the maximum transmittance.

Further, it was found that the transmittance was 2.3% higher than that of the conventional ITO film-coated glass shown in FIG. 2 when the film thickness of the SiOx films 13, 14 was 100 nm.

Here, a mark "x" at the film thickness 0 nm of the SiOx films 13, 14 (1≤x<2) indicates the transmittance of the ITO electrode 2 without attaching the SiOx films 13 and 14 (the conventional ITO film-coated glass shown in FIG. 2), and a straight-line P of a dash-dotted line indicates the transmittance marked with "x" to compare the straight-line P with the curved line.

As result, in the high transmission ITO film-coated glass 30 in the third embodiment, it was found that the ITO film-coated glass with a higher transmittance than that of the conventional glass can be obtained by attaching the SiOx films 13, 14 (1≤x<2) having the film thickness of 30 nm or more when the film thickness of the ITO electrode 2 was 8 nm.

Also, even when the film thickness is 200 nm or more, it is predictable that the ITO film-coated glass with a higher transmittance than that of the conventional ITO film-coated glass can be obtained by attaching the SiOx films 13, 14 (1≤x<2) having a film thickness of at least up to 230 nm. Therefore, it can be said that the ITO film-coated glass surely has a higher transmittance than the conventional ITO film-coated glass when the film thickness of the SiOx films 13, 14 (1≤x<2) is from 30 nm to 230 nm (130 nm±100 nm).

Here, as described above, the film thickness of the ITO electrode 2 is required to be 8 nm±3 nm. Therefore, when the film thickness of the ITO electrode 2 includes a ranges of plus or minus 3 nm, the film thickness of the SiOx films 13, 14 ($1 \leq x < 2$) also has to include a ranges of about plus or minus 10 nm in view of the interference due to the film thicknesses.

That is, it is possible to obtain the ITO film-coated glass with a higher transmittance by a configuration in which the film thickness of the ITO electrode 2 is 8 nm±3 nm and the film thickness of each SiOx film 13, 14 ($1 \leq x < 2$) is 130±90 nm in the high transmission ITO film-coated glass in the third embodiment.

However, in the third embodiment, the SiOx film ($1 \leq x < 2$) 13 is formed on the outside face of the ITO electrode 2 and the SiOx film ($1 \leq x < 2$) 14 is formed on the inside face of the ITO electrode 2 and each SiOx film ($1 \leq x < 2$) has the same film thickness. Therefore, when the film thickness of one of the SiOx films ($1 \leq x < 2$) exceeds 200 nm, a whole film thickness becomes too thick to smoothly incorporate into the optical switch. Thus, it is preferable that one film thickness does not exceed 200 nm, in other words, the film thickness of each SiOx film 13, 14 is preferably 130±70 nm.

Accordingly, the ITO film-coated glass with a higher transmittance than that of the conventional ITO film-coated glass can be obtained by a configuration in which the film thickness of the ITO electrode 2 is 8 nm±3 nm and the film thickness of each SiOx film 13, 14 ($1 \leq x < 2$) is 130±70 nm in the high transmission ITO film-coated glass 30 of the third embodiment.

As described above, according to the high transmission ITO film-coated glass 30 in the third embodiment, it is possible to produce the liquid crystal device which is excellent in a higher transmittance and reduced reflection, produced by fewer steps at lower cost used and used as an optical switch for optical communication utilizing infrared light having a wavelength region from 1530 nm to 1570 nm.

It should be noted that the present invention allows free combinations of each embodiment, variations of any components in each embodiment, or omissions of any components in each embodiment within the scope of the invention.

This application is based on Japanese Patent Application No. 2016-57183 filed by the present applicant in Mar. 22, 2016 to Japan, and the entire contents of which are incorporated herein by reference.

INDUSTRIAL APPLICABILITY

A high transmission ITO film-coated glass of the present invention can be applied to a liquid crystal device used for optical communication utilizing infrared ray. The present invention can also be applied to a liquid crystal device utilizing infrared ray such as LIDAR (Light Detection and Ranging) and an analyzer (for example, measurement of sugar concentration for fruit).

DESCRIPTION OF THE REFERENCE NUMERALS

1: glass substrate,
2: ITO electrode,
3: antireflection film,
4: spacer,
5: liquid crystal layer,
10, 20, 30: high transmission ITO film-coated glass,
11, 12, 13, 14: SiOx film ($1 \leq x < 2$),
51, 52, 53, 54: liquid crystal molecule,
L: infrared ray (infrared light),
L1, L2, L3, L4: polarization state of the incident light, and
L5, L6, L7, L8: polarization state of the outgoing light.

The invention claimed is:

1. A high transmission ITO film-coated glass used for a liquid crystal device utilizing infrared ray having a wavelength range from 1530 nm to 1570 nm as incident light, wherein
the high transmission ITO film-coated glass is configured to be arranged to sandwich a liquid crystal layer,
the high transmission ITO film-coated glass has an ITO film formed on an inside face of a glass substrate to face the liquid crystal layer when arranged with the liquid crystal layer, and
the high transmission ITO film-coated glass has an SiOx film ($1 \leq x < 2$) formed between the ITO film and the glass substrate.

2. The high transmission ITO film-coated glass according to claim 1, wherein
the ITO film has a film thickness of is 8 nm±3 nm, and
the SiOx film ($1 \leq x < 2$) has a film thickness of 50 nm±20 nm.

3. A high transmission ITO film-coated glass used for a liquid crystal device utilizing infrared ray having a wavelength range from 1530 nm to 1570 nm as incident light, wherein
the high transmission ITO film-coated glass is configured to be arranged to sandwich a liquid crystal layer,
the high transmission ITO film-coated glass has an ITO film formed on an inside face of a glass substrate to face the liquid crystal layer when arranged with the liquid crystal layer, and
the high transmission ITO film-coated glass has an SiOx film ($1 \leq x < 2$) formed on a further inside face of the ITO film to face the liquid crystal layer when arranged with the liquid crystal layer.

4. The high transmission ITO film-coated glass according to claim 3, wherein
the ITO film has a film thickness of 8 nm±3 nm, and
the SiOx film ($1 \leq x < 2$) has a film thickness of 200 nm±140 nm.

5. A high transmission ITO film-coated glass used for a liquid crystal device utilizing infrared ray having a wavelength range from 1530 nm to 1570 nm as incident light, wherein
the high transmission ITO film-coated glasses is configured to be arranged to sandwich a liquid crystal layer,
the high transmission ITO film-coated glass has an ITO film formed on an inside face of a glass substrate to face the liquid crystal layer when arranged with the liquid crystal layer, and
the high transmission ITO film-coated glass has a first SiOx film ($1 \leq x < 2$) formed between the ITO film and the glass substrate, and
the high transmission ITO film-coated glass has a second SiOx film ($1 \leq x < 2$) formed on an inside face of the ITO film to face the liquid crystal layer when arranged with the liquid crystal layer.

6. The high transmission ITO film-coated glass according to claim 5, wherein
the ITO film has a film thickness of is 8 nm±3 nm, and
the SiOx film ($1 \leq x < 2$) has a film thickness of 130 nm±70 nm.

* * * * *